United States Patent [19]

Saieva

[11] Patent Number: 4,652,352

[45] Date of Patent: Mar. 24, 1987

[54] PROCESS AND APPARATUS FOR RECOVERING METALS FROM DILUTE SOLUTIONS

[76] Inventor: Carl J. Saieva, 94-21 85th St., Ozone Park, N.Y. 11416

[21] Appl. No.: 794,631

[22] Filed: Nov. 4, 1985

[51] Int. Cl.$^4$ .............................................. C25C 1/00
[52] U.S. Cl. ............................... 204/105 R; 204/107; 204/108; 204/112; 204/113; 204/114; 204/116; 204/118; 204/119; 204/149; 204/275; 210/660; 210/663; 210/670; 210/676; 210/677; 210/681; 521/26
[58] Field of Search ........ 204/112, 113, 114, 116–118, 204/119, 107–108, 105 R, 275, 149, 130; 210/660–661, 663, 670, 681, 676–677; 521/26

[56] References Cited

U.S. PATENT DOCUMENTS

| | | | |
|---|---|---|---|
| 3,457,152 | 7/1969 | Maloney et al. | 204/130 |
| 4,004,994 | 1/1977 | Andrus | 204/130 |
| 4,088,563 | 5/1978 | Marquardt | 210/676 |
| 4,176,056 | 11/1979 | Grier | 210/661 |
| 4,243,498 | 1/1981 | Sherwood et al. | 204/222 |
| 4,318,789 | 3/1982 | Marcantonio | 204/130 |
| 4,387,026 | 6/1983 | Woolacott | 210/677 |
| 4,500,396 | 2/1985 | D'Agostino et al. | 204/106 |
| 4,543,169 | 9/1985 | D'Agostino et al. | 204/106 |

OTHER PUBLICATIONS

"Sludge Disposal . . . ", by Steward et al., Metal Finishing, 11/85, pp. 15–45.
"Environmental Update . . . ", P.C. FAB, 5/85, pp. 12–30.
"Two Cation Exchange Columns . . . ", Chem. Processing, 8/84, pp. 102–103.
"Impact . . . ", by Mabbett et al., Metal Finishing, 4/85, pp. 25–60.

Primary Examiner—R. L. Andrews
Attorney, Agent, or Firm—Stiefel, Gross, Kurland & Pavane

[57] ABSTRACT

A process and apparatus are provided for recovering metals from dilute solution utilizing ion exchange and, optionally, electrolytic recovery. Ammonium salt regeneration solutions for use in the process and apparatus are also provided. In one aspect, the invention provides a closed loop process and apparatus whereby metals may be recovered from spent electroplating rinse solutions for reuse in the electroplating bath with essentially no generation of waste.

50 Claims, 2 Drawing Figures

PROCESS AND APPARATUS FOR RECOVERING METALS FROM DILUTE SOLUTIONS

BACKGROUND OF THE INVENTION

The invention is directed to a process and apparatus for recovering metals from dilute solutions. Particularly, it is desired to recover nickel and other metals from drag-out or rinse solutions (hereinafter referred to collectively as rinse solutions) leaving electroplating equipment.

Electroplating systems generate waste water streams containing significant concentrations of the metal being plated. Concentration of the metal in the waste stream may be in the range of a trace amount up to 2,000 ppm or higher.

The Environmental Protection Agency (EPA) has set stringent discharge limits on the concentration of various metals in waste streams. Various methods have been suggested for meeting these discharge limits (e.g., precipitation, electrolytic recovery, evaporation, reverse osmosis and ion exchange).

All of the suggested processes have drawbacks. For example, the precipitation method, which generally uses lime or alkali treating agents, produces a metal containing sludge which must be disposed of. This creates a landfill problem. With respect to the electrolytic and evaporation methods, both are energy intensive resulting in high operating costs since the waste streams being treated are typically quite dilute. Reverse osmosis has also been suggested. However, this process depends on delicate membranes which are sensitive to variations in pH and temperature. Additionally, the reverse osmosis process generates a concentrated waste that presents a disposal problem. Finally, ion exchange has enjoyed some degree of success because it is especially suited for dilute waste streams. However, the ion exchange process is a tedious operation and also generates a metal containing waste consisting of regeneration chemicals, back washes and rinses.

Accordingly, it is an object of the present invention to provide an effective yet economical process and apparatus for removing metals from dilute solutions, especially electroplating and electroless plating rinse solutions.

Additionally, it is an object of the present invention to provide a process and apparatus designed for retrofit in existing electroplating systems for recovering metals from the rinse solutions generated by the electroplating systems.

More particularly, it is an object of the present invention to provide a closed-loop process and apparatus suitable for new installations or retrofits for recovering metals from an electroplating bath rinse solution for reuse in the electroplating system while essentially generating no liquid or solid wastes requiring disposal.

SUMMARY OF THE INVENTION

The present invention relates to a process and apparatus for capturing metals from dilute solution using ion exchange and, optionally, recovering the metals using electrolytic recovery.

As used herein, the term "dilute solution" means a solution in which the metal concentration is sufficiently low to make economic recovery difficult. The actual concentration range of a dilute solution as that term is used herein will accordingly depend upon several factors such as the metal being recovered, market value of the metal, and capital, operating and energy costs. According to the present invention, ion exchange is used to capture metals from dilute solutions (e.g., electroplating and electroless plating system rinse solutions). The ion exchange system is the regenerated using an ammonium salt regeneration solution. The ammonium salt solution strips the captured metals from the ion exchange system forming a concentrated solution from which the metals may be economically recovered in a plating cell or reused as is in an electroplating bath.

In a preferred embodiment of the present invention, the rinse is reused following capture of the metals in the ion exchange system thereby closing a first loop of the process. Additionally, the stripping solution is reused following electrolytic recovery of the metals in the plating cell and the recovered metals are reused in the electroplating bath, thereby closing second and third loops of the process. In this way, essentially no liquid or solid waste requiring disposal is generated.

The combination of ion exchange/ammonium salt regeneration and electrolytic recovery provides a two-fold benefit. First, through ion exchange/ammonium salt regeneration, the metal values are highly concentrated thereby making their electrolytic recovery very economical when compared with the cost of electrolytically recovering these same metal values from dilute solutions. Second, electrolytic recovery of the metal values from the solution eliminates the problem of disposing a concentrated metal-contaminated regeneration solution.

Other advantages and objects of the present invention will become apparent from the following detailed description and annexed drawings of the preferred embodiments of the invention.

DESCRIPTION OF THE PREFERRED EMBODIMENTS

It has been found that dissolved or suspended metals in any form can be recovered from solution in highly concentrated form using ion exchange in combination with stripping of the metal from the ion exchange system using an ammonium salt solution. The ion exchange process captures the metal from a relatively dilute solution while the ammonium salt solution strips the captured metal with high efficiency thereby generating a solution having a relatively high metal concentration. This highly concentrated solution may be reused in an electroplating bath, if desired, or may be directed to a plating cell where the metal is electrolytically recovered (plated out) for reuse or salvage. Electrolytic recovery may be very economical for recovering some metals (e.g. nickel, copper, zinc, chromium, etc.) since the value of the recovered metal is generally higher than the cost of electrolytic recovery from the concentrated solution. The basic process steps according to the invention are shown in FIG. 1.

Figure 1:
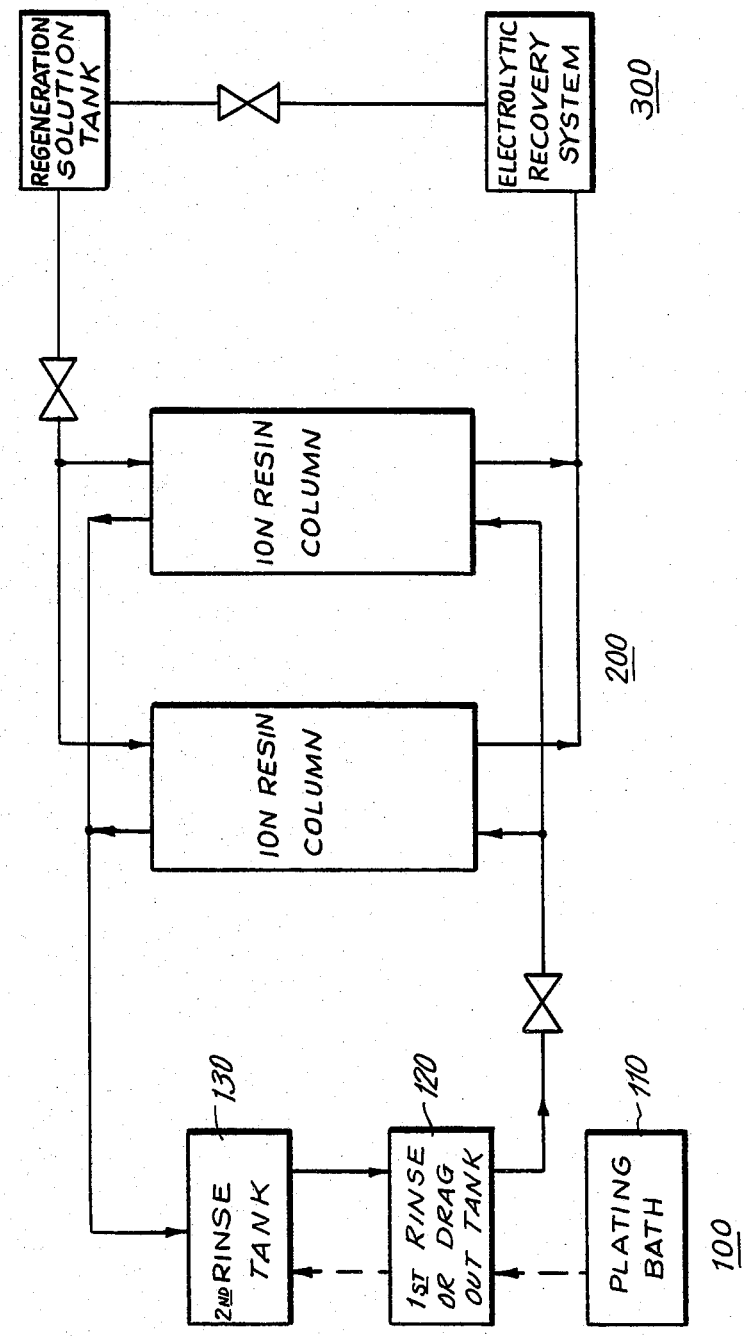
FIG. 1 is a schematic representation of a process and apparatus according to the present invention.

As shown in FIG. 1, a rinse solution from an electroplating system 100 passes through an ion exchange system 200. The electroplating system 100 generally comprises a plating bath 110, first rinse or drag out tank 120 (whether the tank is used as a first rinse tank or drag out tank depends on the metal plater's requirements—hereinafter the term "drag out tank" shall be understood to refer to the tank 120 whether used as a first rinse or drag out tank) and a second rinse tank 130. Rinse solution flows from the second rinse tank 130 to the drag out tank 120 and from there into the ion exchange system 200. Alternatively, rinse solution can be pumped to the ion exchange system directly from the second rinse tank 130. It will be understood that the electroplating system 100 may already be in existence. In this case the ion exchange system 200 (as well as the other components which may be used for recovering metal from the rinse solution as described below) may be retrofitted on the existing electroplating system 100.

The rinse solution typically has a metal contaminant concentration in the range of a trace amount up to as high as 2000 ppm or higher as it exits the electroplating system 100. The ion exchange system 200 removes virtually all of the metal contaminants from the rinse solution. The rinse solution, now free of metal contaminants, may be disposed of without violating local, state or federal limits on metal contaminant concentration. Preferably, the rinse solution is recycled back to the electroplating system 100 following passage through the ion exchange system 200.

Eventually, the ion exchange system 200 becomes saturated with metal contaminants. When this occurs the ion exchange system 200 is regenerated by passing an ammonium salt regeneration solution therethrough. The regeneration solution strips the metal contaminants from the ion exchange system 200 and exits the system typically with a metal concentration in the range of 1,000 to 50,000 ppm.

The regeneration solution, loaded with metal contaminants, then passes through an electrolytic recovery system 300 wherein the metal contaminants are plated out. The solution exits the electrolytic recovery system 300 essentially free of metal contaminants. The regeneration solution may then be disposed of without violating local, state or federal limits on metal contaminant concentration. Preferably, the regeneration solution is stored for reuse following passage through the electrolytic recovery system 300. The metal recovered in the electrolytic recovery system 300 may be either sold as scrap or reused in the electroplating system 100.

Of course, it is not necessary to recirculate the rinse or the regeneration solution. However, recirculation is preferable from the standpoint of conservation.

While any ammonium salt regeneration solution may be used, preferred regeneration solutions include ammonium sulfate/ammonium hydroxide (preferred for stripping nickel), ammonium sulfate/sulfuric acid (preferred for stripping copper), ammonium chloride/ammonium hydroxide (preferred for stripping zinc and chromium). Additionally, it has been found that nickel, copper, zinc and chromium can be effectively stripped using ammonium sulfate/hydrochloric acid, ammonium chloride/hydrochloric acid, and ammonium chloride/sulfuric acid. The temperature of the regeneration solution should be in the range of about 10° to about 65° C. In the ammonium sulfate/ammonium hydroxide solution, the ammonium sulfate concentration may be in the range of about 0.1 weight percent to saturation, preferably about 20 weight percent and the ammonium hydroxide concentration may be in the range of about 0.1 to about 30 weight percent, preferably, about 15 weight percent. In the ammonium sulfate/sulfuric acid solution, the ammonium sulfate concentration may be in the range of about 0.1 weight percent to saturation, preferably about 20 weight percent, and the sulfuric acid concentration may be in the range of about 0.1 to about 20 weight percent, preferably about 0.5 weight percent. In the ammonium chloride/ammonium hydroxide solution, the ammonium chloride concentration may be in the range of about 0.1 weight percent to saturation, preferably about 17 weight percent, and the ammonium hydroxide concentration may be in the range of about 0.1 to about 30 weight percent, preferably about 10 weight percent. In the ammonium sulfate/hydrochloric acid solution, the ammonium sulfate concentration may be in the range of about 0.1 weight percent to saturation, preferably about 20 weight percent, and the hydrochloric acid concentration may be in the range of about 0.1 to about 35 weight percent, preferably about 0.5 weight percent. In the ammonium chloride/hydrochloric acid solution, the ammonium chloride concentration may be in the range of about 0.1 weight percent to saturation, preferably about 20 weight percent, and the hydrochloric acid concentration may be in the range of about 0.1 to about 35 weight percent, preferably about 0.5 weight percent. Finally, in the ammonium chloride/sulfuric acid solution, the ammonium chloride concentration may be in the range of about 0.1 weight percent to saturation, preferably about 20 weight percent, and the sulfuric acid concentration may be in the range of about 0.1 to about 30 weight percent, preferably about 0.5 weight percent.

While the invention is not restricted to the use of any particular ion exchange resin, the preferred ion exchange resin for recovering metal cations is a macroreticular strongly acidic cation exchange resin such as "AMBERLITE® 200", (a trademark of Rohm and Haas Co., Philadelphia, Pa.), while when the metal value is in the form of a negative metal complex it is preferred to use a macroreticular strongly basic anion exchange resin such as "AMBERLITE® IRA-900" (a trademark of Rohm and Haas Co. Philadelphia, Pa..

Figure 2:
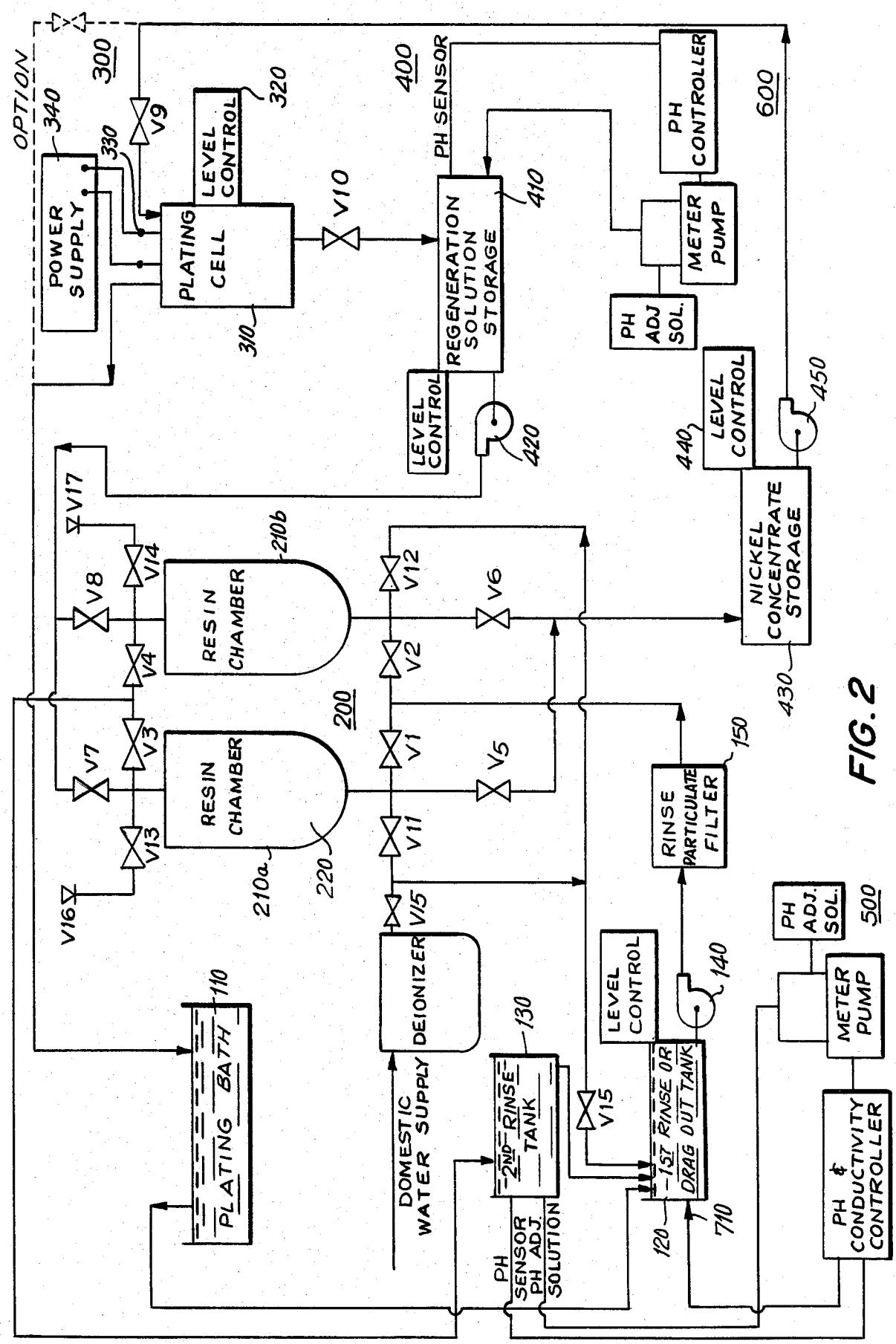
FIG. 2 is a schematic representation of a process and apparatus according to the present invention.

FIG. 2 shows a preferred metal recovery system according to the claimed invention. The system comprises resin chambers 210a and 210b which are alternately receiving rinse solution from drag-out tank 120 or being regenerated. The rinse solution is pumped through one of the resin chambers 210a, 210b wherein the metal values in the rinse solution are captured. The rinse solution then passes out the top of the resin chamber 210a, 210b and is recycled back to the rinse tank 130. Alternatively, the rinse solution could be disposed of as it exits the resin chamber 210a, 210b. The system also comprises a plating cell 310. During operation of the system, a loaded resin chamber 210a, 210b is regenerated by passing a regeneration solution through it. The regeneration solution is then pumped to the plating cell 310 wherein the metal values stripped from the resin chamber 210a, 210b are plated out. A power supply 320 is provided for the plating cell. The requirements for the power supply and its operation will be known to those having ordinary skill in the art.

Except where otherwise noted, it is presently preferred to use corrosion resistant pumps, such as "MARCH" pumps (Model MDXT-3, P.P. case and impeller, 110 V, 60 HZ, S.P.). "MARCH" is a tradename of March Mfg., Inc., Glenview, Ill. It is also presently preferred to use true union ball valves such as "PLAST-O-MATIC" (a tradename of BLDL Inc., Totowa, N.J.) valves with 24 VAC electric actuators (valves V1–V15) and vacuum breaker valves (valves V16 and V17) such as "HAYWARD" (a trademark of Hayward Industrial Products, Elizabeth, N.J.) vacuum breaker valves.

The preferred system also comprises a pH adjustment system 500 for adjusting the pH of the rinse solution and a pH adjustment system 600 for adjusting the pH of the regeneration solution. Known pH adjustment systems may be used, such as "COLE PARMER" pH control pump systems (MOD.BB 7142-50). "COLE PARMER" is a tradename of Cole Parmer Instrument Co., Chicago, Ill. Preferably, pH adjustment of the regeneration solution is carried out using ammonium hydroxide (for raising the pH) or sulfuric acid (for lowering the pH).

The operation of a metal recovey system according to the present invention will now be described. During operation, a conductivity sensor 710 (such as a "MYRON L CONTROLSTIK II" a trademark of Myron L Co., Carlsbad, Ca.) which is located in dragout tank 120 measures the conductivity of the rinse solution. The conductivity correlates with the concentration of metal ion. When the conductivity reaches a predetermined value, valves V1 and V3 open and pump 140, preferably an epoxy gear pump, such as a "JABSCO" (tradename of Jabsco Pump, Inc., Costa Mesa, Ca.) Model 18000-0004, ⅛H.P., 60 HZ, S.P., begins pumping solution from drag-out tank 120 through rinse particulate filter 150, such as a "FULFLO" (a trademark of Commercial Filters, Lebanon, Ind.) Model No. WS12/RWS5 filter with a particulate cartridge element, to remove any particulate matter. The solution then flows through resin chamber 210a (e.g. a 2 inch I.D.X 60 inch long PVC column having "FERRO" (a trademark of Ferro Corp., East Rochester, N.Y.) permeable ceramic filters MOD. A-400 on top and MOD. QR-340 on bottom for retaining ion exchange resin within the column and a four liter charge of resin) where the metal ion is captured by the ion exchange resin 220 within the resin chamber 210a. The effluent from the resin chamber 210a is then returned to the second rinse tank 130. In the preferred embodiment, any adjustment to the pH of the rinse solution is made in the rinse tank 130.

Once chamber 210a has become fully loaded with captured metal, valves V1 and V3 are closed, valves V11 and V13 are opened and vacuum breaker valve V16 opens to allow rinse solution to drain from the chamber 210a. Once the chamber 210a has been drained, valves V11 and V13 are closed and the chamber is now ready for regeneration. During the time that resin chamber 210a is being drained and regenerated, valves V2 and V4 are opened to divert the flow of rinse solution through resin chamber 210b. In like manner, when resin chamber 210b becomes fully loaded valves V2 and V4 are closed, valves V12 and V14 are opened and vacuum breaker valve V17 opens to allow rinse solution to drain from the chamber 210b. Once the chamber 210b has been drained, valves V12 and V14 are closed and the chamber is now ready for regeneration. Of course, it will be recognized that the resin chambers 210a, 210b should have sufficient ion exchange capacity to ensure continuous operation. That is, chamber 210a should not become fully loaded before chamber 210a has been drained and regenerated and vice versa.

Regeneration of resin chamber 210b will now be described. During the period that resin chamber 210a is receiving the flow of rinse solution, resin chamber 210b is receiving regeneration solution from tank 410 (such as a twenty-liter polyethylene tank containing a ten liter initial charge of regeneration solution) which is pumped to the resin chamber by pump 420. Valves V8 and V6 are open to allow flow of regeneration solution through resin chamber 210b (valves V7 and V5 are opened when resin chamber 210a is being regenerated). The regeneration solution strips the ion exchange resin 220 of captured metal ions or complexes and exits the resin chamber 210b as a concentrated solution. The concentrated regeneration solution flows into tank 430 (such as a twenty liter polyethylene tank). Level control 440 ("MARTRON LO-HI"—a trademark of Martron, Inc., Santa Ana, Ca.—liquid level controls may be used for all level control applications) attached to tank 430 determines when a predetermined level of concentrated regeneration solution has been accumulated. Once the predetermined level is reached, pump 420 is stopped, valve V8 is closed, and valve V14 is subsequently opened. Resin chamber 210b is thus allowed to drain. After a predetermined time sufficient to drain chamber 210b, valves V6 and V14 are closed whereupon resin chamber 210b is again ready to accept flow of rinse solution.

At this point, the concentrated regeneration solution in tank 430 may be reused in the electroplating system, if desired. Alternatively, the concentrated solution may be sent to the plating cell 310 for electrolytic recovery (plating out) of the metal. For purposes of illustration this latter step will now be described.

Level control 320 attached to the plating cell 310 (such as a twelve liter polyethylene tank) measures the level of regeneration solution in the cell. When the level falls below a predetermined point, pump 450 is energized and valve V9 is opened to allow concentrated regeneration solution to flow from tank 430 into the plating cell 310. In the plating cell 310, the metal is plated out until its concentration in the regeneration solution is reduced to a predetermined level which is preferably substantially zero. At this point, valve V10 is opened and the remaining solution is allowed to flow into regeneration solution storage tank 410. Here, pH adjustment may be made as necessary whereupon the solution is ready for reuse for regenerating the resin chambers 210a, 210b.

In the plating cell 310, the captured metal is preferably plated to a carbon (graphite), stainless steel or some other suitable cathode 330 (such as a 12×18×¼ inch graphite electrode as manufactured by Graphite Machining Company of Ohio, Cleveland, OH) after which the metal can be sold in its existing form or stripped from the cathode 330 and the resulting metal placed in an anode bag and used in the plating bath 110. If the cathode 330 is formed of carbon, it may be placed directly into the plating bath 110 as an anode and the metal plated off.

Although the system may be operated manually, (e.g. manual operation of valves and pumps) it is preferred to employ various monitoring and control devices for automatic operation. For example, the resin chambers 210a, 210b must be periodically regenerated. Normally this will be done at some point before the chambers become fully loaded. Accordingly, in one preferred embodiment, a conventional timed control system (not shown) is used to control regeneration of the resin chambers 210a, 210b. Timed control systems for regenerating ion exchange columns are known and will therefore not be described in detail. Preferably, the valves, pumps, etc. of the system are controlled using a programmable microprocessor controller (not shown) having inputs for pH, temperature, conductivity, flow rate and liquid level.

Make-up water, when needed, should be deionized before addition to the system to avoid incorporating unwanted impurities. Conventional deionizing systems, such as are known in the art are satisfactory.

It should be understood that the present invention is not limited to the recovery of any particular metal or any particular form thereof. For example, nickel, zinc, copper and chromium are just a few of the metals which may be economically recovered using the present invention. Additionally, the metal may be recovered in ionic or metal complex form.

The present invention will now be illustrated with the following examples:

EXAMPLE 1

A burette was loaded with 40 ml. of "AMBERLITE ® A200" ion exchange resin. After washing with 2 bed volumes of distilled water, nickel drag-out and rinse water having a nickel concentration of 560 ppm to 1,200 ppm was allowed to enter at the top of the burette and flow downward gravimetically. A total of 2.8 liters of drag-out-rinse solution was treated with no nickel breakthrough. The resin was then stripped with 80 ml of a regeneration solution consisting of 20% ammonium sulfate and 15% ammonium hydroxide. The spent regeneration solution was introduced into a plating cell. Current was supplied from a rectifier and the nickel was recovered as a nickel metal foil on the cathode. The results are summarized in Table I.

TABLE I

| Ni Conc. of Incoming Waste Water | Volume of Waste Water Treated | Ni Conc. of Effluent |
|---|---|---|
| 560 ppm | 125 ml | 0.1 ppm |
|  | 250 | — |
|  | 375 | — |
|  | 500 | 0.1 |
|  | 625 | — |
|  | 750 | — |
|  | 875 | — |
|  | 1000 | 0.1 ppm |
|  | 1125 | — |
|  | 1250 | — |
|  | 1375 | — |
|  | 1500 | 0.2 ppm |
|  | 1625 | — |
|  | 1750 | — |
|  | 1875 | — |
|  | 2000 | 0.2 ppm |
|  | 2125 | — |
|  | 2250 | — |
|  | 2375 | — |
|  | 2500 | 0.2 ppm |
|  | 2650 | — |
|  | 2775 | 0.2 ppm |

Total volume treated: 2.8 liters per 40 ml resin
Total nickel captured: 1.6 g

EXAMPLE 2

A column made of PVC plastic of 1½ inch I.D. and 58 inches long was loaded with "AMBERLITE ® A200" ion exchange resin to a height of about 50 inches. Approximately 2.55 pounds of ion exchange resin was used. Nickel waste water from drag-out rinses was passed through the column at an average flow rate of three liters per minute. A total of 50 liters of waste water was treated with no nickel breakthrough. A regeneration solution made up of 20% ammonium sulfate and 15% ammonium hydroxide was used to strip the captured nickel ions from the resin column. Two liters of regeneration solution was used and introduced into a plating cell in which 2 carbon anodes and one stainless steel cathode were employed. A constant current of 15 amperes from a rectifier was used to plate out nickel as a foil on the cathode. Approximately 60 grams was captured in the resin column and 60 grams of foil was recovered. The data pertaining to the capture of nickel ions in the ion exchange resin is shown in table II while the recovery of nickel from the regeneration solution is shown in table III.

TABLE II

| NICKEL CAPTURE | | |
|---|---|---|
| Ni Conc. of Incoming Waste Water | Vol. of Waste Water Treated | Ni Conc. of Effluent |
| 1200 ppm | 4 liters | 0 |
|  | 7 | 0 |
|  | 11 | 0 |
|  | 16 | 0 |
|  | 21 | 0 |
|  | 24 | 0 |
|  | 27 | 0 |
|  | 32 | 0 |
|  | 37 | 0 |
|  | 39 | 0 |
|  | 41 | 0 |
|  | 44 | 0 |
|  | 46 | 0 |
|  | 47 | 0 |
|  | 48 | 0 |
|  | 49 | 0 |
|  | 50 | Trace |

TABLE III

| NICKEL RECOVERY | | | | |
|---|---|---|---|---|
| Time (MIN.) | DC Voltage (VOLTS) | DC Current (AMPS) | pH | Watt-Hours |
| 0 |  |  |  | — |
| 15 | 3.79 | 15 | 8.0 | — |
| 30 | 3.68 | 15 | 7.5 | 14.21 |
| 45 | 3.65 | 15 | 7.5 | 14.25 |
| 60 | 3.56 | 15 | 7.5 | 13.69 |
| 70 | 3.49 | 15 | 7.5 | 8.90 |
| 100 | 3.21 | 15 | 8.0 | 26.18 |
| 130 | 3.05 | 15 | 8.0 | 24.08 |
| 160 | 3.08 | 15 | 7.5 | 22.88 |
| 190 | 3.23 | 15 | 7.5 | 23.10 |
| 220 | 3.72 | 15 | 7.5 | 24.23 |
| 250 | 3.64 | 15 | 7.0 | 27.90 |
| 280 | 3.02 | 15 | 9.0 | 27.30 |
| 310 | 2.98 | 15 | 8.5 | 22.65 |
| 340 | 2.99 | 15 | 8.5 | 22.35 |
| 370 | 2.96 | 15 | 8.0 | 22.43 |

EXAMPLE 3

Drag-out and rinse water from an acid copper plating bath was treated as in the preceding examples. 40 ml of "AMBERLITE ® A200" ion exchange resin was introduced into a burette and waste water containing 1,000 ppm of copper was poured into the burette from the top and allowed to flow downward gravimetrically. A total of 2.2 liters of copper solution was treated with no copper breakthrough. The resin was then stripped with a 20% ammonium sulfate and 0.5% sulfuric acid solution. The regeneration solution which was colorless initially became dark blue after passing through the resin column and was transferred into a plating cell. The plating cell had a carbon anode and a stainless steel cathode. A constant current was supplied from a rectifier and the copper was plated out as copper foil on the cathode. The results are given in Tables IV and V respectively.

TABLE IV
COPPER CAPTURE

| Copper Conc. of Incoming Water | Volume of Waste Water Treated | Copper Conc. of Effluent |
|---|---|---|
| 1000 ppm | 200 ml | 0.2 ppm |
|  | 600 | — |
|  | 800 | — |
|  | 1000 | 0.2 |
|  | 1200 | — |
|  | 1400 | — |
|  | 1600 | 0.3 |
|  | 1800 | — |
|  | 2000 | — |
|  | 2100 | 0.4 |
|  | 2200 | 0.5 |

Total volume treated: 2.2 liters per 40 ml resin
Total copper captured: 2.20 g

TABLE V
COPPER RECOVERY

| Time | DC Voltage | DC Current | pH | Watt-hours |
|---|---|---|---|---|
| 15 min. | 3.19 VOLTS | 1.0 AMPS | 1.0 | — |
| 30 | 3.26 | 1.0 | — | 0.798 |
| 45 | 3.23 | 1.0 | 1.0 | 0.815 |
| 60 | 3.22 | 1.0 | — | 0.808 |
| 75 | 3.27 | 1.0 | 1.0 | 0.805 |
| 90 | 3.32 | 1.0 | — | 0.818 |
| 105 | 3.33 | 1.0 | — | 0.830 |
| 120 | 3.33 | 1.0 | — | 0.833 |
| 135 | 3.33 | 1.0 | 1.0 | 0.833 |

Total copper recovered 2.14 g

EXAMPLE 4

A burette was filled with 40 ml of "AMBERLITE® IRA-900" ion exchange resin, a strong anionic resin. Industrial chromium plating rinse water which contained 1,200 ppm of chromium was allowed to flow through the burette from the top and the flow rate was adjusted to 23 ml per minute. After 900 ml of rinse water had passed through the column, the effluent was checked for chromium concentration. The results are given in Table VI.

TABLE VI

| Chromium Conc. of Incoming Water | Volume of Waste Water Treated | Chromium Conc. of Effluent |
|---|---|---|
| 1200 ppm | 100 ml | 0.60 ppm |
|  | 300 |  |
|  | 500 | 0.62 ppm |
|  | 700 |  |
|  | 900 | 0.69 ppm |

Total volume treated: 900 ml per 40 ml of resin

Total chromium captured: 1.08 g

The column was regenerated with an ammonium salt regeneration solution consisting of 17% ammonium chloride and 10% ammonium hydroxide, stripping the chromium off the resin easily. Only one bed volume (40 ml) of regeneration solution was needed. The regeneration solution was concentrated enough for further use as a plating make-up solution.

EXAMPLE 5

A burette was filled with 40 ml of "AMBERLITE® A200" ion exchange resin. Acid zinc plating rinse water containing 801 ppm of zinc was introduced at the top and allowed to flow through the burette gravimetrically at a maximum flow rate. Four liters of rinse water were passed through the column and the results are shown in Table VII.

TABLE VII

| Zinc Conc. of Incoming Water (ppm) | Volume of Rinse Water Passed (ml) | Zinc Conc. In Effluent (ppm) |
|---|---|---|
| 801 | 250 | 0 |
| 801 | 500 | 0 |
| 801 | 750 | 0 |
| 801 | 1000 | 0 |
| 801 | 1250 | 0 |
| 801 | 1500 | 0 |
| 801 | 1750 | 0 |
| 801 | 2000 | 0 |
| 801 | 2250 | 0 |
| 801 | 2500 | 0 |
| 801 | 2750 | 0 |
| 801 | 3000 | 0 |
| 801 | 3250 | 0 |
| 801 | 3500 | 0 |
| 801 | 3750 | Trace |
| 801 | 4000 | Trace |

Total Zinc captured = 3.204 grams

The resin column was then regenerated with a regeneration solution comprising 10% ammonium chloride and 5% ammonium hydroxide. The regeneration solution had a pH of 9. A total of 180 ml of regeneration solution was used. The colorless solution with a high concentration of zinc was passed into a plating cell having a carbon anode and cathode. A constant DC current was supplied at low voltage for a period of 1.75 hours. Total zinc captured on the cathode was 3.17 grams.

It will be understood that numerous modifications can be made to the present invention without deviating from the spirit and scope thereof. Accordingly, the foregoing description is not meant to limit the scope of the present invention but is merely illustrative thereof, the scope of the invention being defined by the following claims.

What is claimed is:

1. A closed loop process for recovering metal from a rinse solution exiting an electroplating or electroless plating process, comprising the steps of:
   (a) capturing the metal ions from the rinse solution by passing the rinse solution through an ion exchanger;
   (b) thereafter returning the rinse solution to the electroplating or electroless plating process for reuse therein such that discharge or disposal of the rinse solution is not required;
   (c) providing an ammonium salt regeneration solution and storing same in a storage tank, where the ammonium salt regeneration solution is one selected from the group consisting of (1) an ammonium salt and a mineral acid and (2) an ammonium salt and ammonium hydroxide and, where the regeneration solution is of the ammonium salt and ammonium hydroxide type, the ion exchanger is of the strongly acidic cationic type;
   (d) stripping the captured metal from the ion exchanger with said regeneration solution from said storage tank;
   (e) transferring the regeneration solution containing concentrated metal ions to an electrochemical cell;
   (f) plating the metal out of the regeneration solution in the electrochemical cell such that disposal of the recovered metal is not required, and;

(g) thereafter returning the regeneration solution to the regenerant storage tank for reuse in the ion exchanger for again stripping the captured metal therefrom such that discharge or disposal of the regeneration solution is not required.

2. The closed loop process of claim 1, further comprising the step of returning the electrolytically recovered metal to the electroplating process such that the recovery process is closed loop for liquids and solids with essentially no discharge of liquid or solid wastes requiring disposal.

3. The process of claim 1, wherein the rinse solution contains low concentrations of metal and wherein the ammonium salt regeneration solution comprises an aqueous solution of ammonium sulfate and ammonium hydroxide.

4. The process of claim 3, wherein the metal recovered is nickel.

5. The process of claim 4, wherein the ammonium sulfate concentration is in the range of about 0.1 weight percent to saturation and the ammonium hydroxide concentration is in the range of about 0.6 to about 30 weight percent.

6. The process of claim 5, wherein the ammonium sulfate concentration is about 20 weight percent and the ammonium hydroxide concentration is about 5 weight percent.

7. The process of claim 6, further comprising the step of returning the electrolytically recovered metal to the electroplating process such that the recovery process is closed loop for liquids and solids with essentially no discharge of liquid or solid wastes requiring disposal.

8. The process of claim 1, wherein the ammonium salt regeneration solution comprises an aqueous solution of ammonium chloride and ammonium hydroxide.

9. The process of claim 8, wherein the metal recovered is taken from the group consisting of zinc or chromium.

10. The process of claim 9, wherein the ammonium chloride concentration is in the range of about 0.1 weight percent to saturation and the ammonium hydroxide concentration is in the range of about 0.6 to about 30 weight percent.

11. The process of claim 10, wherein the ammonium chloride concentration is about 17 weight percent and the ammonium hydroxide concentration is about 10 weight percent.

12. The process of claim 11, further comprising the step of returning the electrolytically recovered metal to the electroplating process such that the recovery process is closed loop for liquids and solids with essentially no discharge of liquid or solid wastes requiring disposal.

13. The process of claim 1, wherein the ammonium salt regeneration solution comprises an aqueous solution of ammonium sulfate and sulfuric acid.

14. The process of claim 13, wherein the metal recovered is copper.

15. The process of claim 14, wherein the ammonium sulfate concentration is in the range of about 0.1 weight percent to saturation and the sulfuric acid concentration is in the range of about 0.1 to about 20 weight percent.

16. The process of claim 15, wherein the ammonium sulfate concentration is about 20 weight percent and the sulfuric acid concentration is about 0.5 weight percent.

17. The process of claim 16, further comprising the step of returning the electrolytically recovered metal to the electroplating process such that the recovery process is closed loop for liquids and solids with essentially no discharge of liquid or solid wastes requiring disposal.

18. The process of claim 1, wherein the ammonium salt regeneration solution comprises an aqueous solution of ammonium sulfate and hydrochloric acid.

19. The process of claim 18, wherein the metal recovered is taken from the group consisting of nickel, copper, chromium or zinc.

20. The process of claim 19, wherein the ammonium sulfate concentration is in the range of about 0.1 weight percent to saturation and the hydrochloric acid concentration is in the range of about 0.1 to about 35 weight percent.

21. The process of claim 20, wherein the ammonium sulfate concentration is about 20 weight percent and the hydrochloric acid concentration is about 0.5 weight percent.

22. The process of claim 21, further comprising the step of returning the electrolytically recovered metal to the electroplating process such that the recovery process is closed loop for liquids and solids with essentially no discharge of liquid or solid wastes requiring disposal.

23. The process of claim 1, wherein the ammonium salt regeneration solution comprises an aqueous solution of ammonium chloride and hydrochloric acid.

24. The process of claim 23, wherein the metal recovered is taken from the group consisting of nickel, copper, chromium or zinc.

25. The process of claim 24, wherein the ammonium chloride concentration is in the range of about 0.1 weight percent to saturation and the hydrochloric acid concentration is in the range of about 0.1 to about 35 weight percent.

26. The process of claim 25, wherein the ammonium chloride concentration is about 20 weight percent and the hydrochloric acid concentration is about 0.5 weight percent.

27. The process of claim 26, further comprising the step of returning the electrolytically recovered metal to the electroplating process such that the recovery process is closed loop for liquids and solids with essentially no dishcarge of liquid or solid wastes requiring disposal.

28. The process of claim 1, wherein the ammonium salt regeneration solution comprises an aqueous solution of ammonium chloride and sulfuric acid.

29. The process of claim 28, wherein the metal recovered is taken from the group consisting of nickel, copper, chromium or zinc.

30. The process of claim 29, wherein the ammonium chloride concentration is in the range of about 0.1 weight percent to saturation and the sulfuric acid concentration is in the range of about 0.1 to about 30 weight percent.

31. The process of claim 30, wherein the ammonium chloride concentration is about 20 weight percent and the sulfuric acid concentration is about 0.5 weight percent.

32. The process of claim 31, further comprising the step of returning the electrolytically recovered metal to the electroplating process such that the recovery process is closed loop for liquids and solids with essentially no discharge of liquid or solid wastes requiring disposal.

33. The process of claim 2, wherein the electrolytic recovery step comprises electrolytically recovering the metal on one or more electrodes and the step of returning the electrolytically recovered metal to the electroplating process comprises transferring said one or more electrodes to the electroplating process for use as electroplating electrodes.

34. The process of claim 33, wherein the metal is nickel and the regeneration solution comprises an aqueous solution of ammonium sulfate and ammonium hydroxide and wherein the ion exchanger is a resin of the strongly acidic cationic type.

35. The process of claim 2, wherein the electrolytic recovery step comprises electrolytically recovering the metal as a metal foil and the step of returning the electrolytically recovered metal to the electroplating process comprises transferring the metal foil into anode baskets and transferring the anode baskets to the electroplating process for use as a metal source during electroplating.

36. The process of claim 35, wherein the metal is nickel and the regeneration solution comprises an aqueous solution of ammonium sulfate and ammonium hydroxide.

37. An apparatus for recovering metal from a rinse solution exiting an electroplating or electroless plating system of the type having plating means for plating objects and rinse or drag out means for rinsing the objects following plating in said plating means, said rinse or drag out means yielding a rinse solution having a metal ion content, said apparatus comprising:
(a) ion exchange means for capturing metal ions from the rinse solution;
(b) means for transferring said rinse solution to said ion exchange means;
(c) means for returning the stripped rinse solution to said rinse or drag out means;
(d) means holding an ammonium salt regeneration solution capable of regenerating said ion exchange means by stripping the captured metal therefrom;
(e) an ammonium salt regeneration solution wherein the ammonium salt regeneration solution is one selected from the group consisting of (1) an ammonium salt and a mineral acid and (2) an ammonium salt and ammonium hydroxide and, where the regeneration solution selected is of the ammonium salt and ammonium hydroxide type, the ion exchanger is of the strongly acidic cationic type;
(f) means for transferring said ammonium salt regeneration solution from said holding means to said ion exchange means;
(g) means for electrolytically recovering metal from the regeneration solution exiting the ion exchange means;
(h) means for transferring the regeneration solution exiting the ion exchange means to said electrolytic recovery means; and
(i) means for returning the regeneration solution from the electrolytic recovery means to the holding means, such that said apparatus defines a closed loop for the rinse solution and the regeneration solution with essentially no dishcarge of liquid requiring disposal and whereby the metal content of the rinse solution is economically recovered.

38. The apparatus according to claim 37, wherein said system is an electroplating system, and further comprising means for returning said electrolytically recovered metal to said plating means.

39. The apparatus according to claim 37, wherein said ion exchange means comprises at least two ion exchange columns, and further comprising flow control means for controlling the flow of rinse solution and regeneration solution through said ion exchange columns for directing rinse solution through one column while the other column is being regenerated and vice versa, thereby accommodating continuous operation.

40. The apparatus according to claim 39, wherein said flow control means comprises a microprocessor.

41. An apparatus for recovering metal from a rinse solution in an electroplating or electroless plating process, said apparatus comprising:
(a) an electroplating or electroless plating system having plating means for plating objects and rinse or drag out means for rinsing the objects following plating in said plating means, said rinse or drag out means yielding a rinse solution having a metal ion content;
(b) ion exchange means for capturing metal ions from the rinse solution;
(c) means for transferring said rinse solution to said ion exchange means;
(d) means for returning the stripped rinse solution to said rinse or drag out means;
(e) means holding an ammonium salt regeneration solution capable of regenerating said ion exchange means by stripping the captured metal therefrom;
(f) an ammonium salt regeneration solution wherein the ammonium salt regeneration solution is one selected from the group consisting of (1) an ammonium salt and a mineral acid and (2) an ammonium salt and ammonium hydroxide and, where the regeneration solution selected is of the ammonium salt and ammonium hydroxide type, the ion exchanger is of the strongly acidic cationic type;
(g) means for transferring said ammonium salt regeneration solution from said holding means to said ion exchange means;
(h) means for electrolytically recovering metal from the regeneration solution exiting the ion exchange means;
(i) means for transferring the regeneration solution exiting the ion exchange means to said electrolytic recovery means; and
(j) means for returning the regeneration solution from the electrolytic recovery means to the holding means.

42. The apparatus according to claim 41, wherein said system is an electroplating system, and further comprising means for returning said electrolytically recovered metal to said plating means.

43. The apparatus according to claim 41, wherein said ion exchange means comprises at least two ion exchange columns, and further comprising flow control means for controlling the flow of rinse solution and regeneration solution through said ion exchange columns for directing rinse solution through one column while the other column is being regenerated and vice versa, thereby accommodating continuous operation.

44. The apparatus according to claim 43, wherein said flow control means comprises a microprocessor.

45. An apparatus for recovering metal from a rinse solution exiting an electroplating or electroless plating system of the type having plating means for plating objects and rinse or drag out means for rinsing the objects following plating in said plating means, said rinse or drag out means yielding a rinse solution having a metal ion content, said apparatus comprising:
(a) ion exchange means for capturing metal ions from the rinse solution;

(b) means for transferring said rinse solution to said ion exchange means;

(c) means for returning the stripped rinse solution to said rinse or drag out means;

(d) means holding an ammonium salt regeneration solution capable of regenerating said ion exchange means by stripping the captured metal therefrom;

(e) means for transferring said ammonium salt regeneration solution from said holding means to said ion exchange means;

(f) means for transferring the regeneration solution exiting said ion exchange means to said plating means; and (g) means for transferring the regeneration solution from said plating means to said holding means following demetallization of said regeneration solution by said plating means.

46. The apparatus according to claim 45, wherein said ion exchange means comprises at least two ion exchange columns, and further comprising flow control means for controlling the flow of rinse solution and regeneration solution through said ion exchange columns for directing rinse solution through one column while the other column is being regenerated and vice versa, thereby accommodating continuous operation.

47. The apparatus according to claim 46, wherein said flow control means comprises a microprocessor.

48. An apparatus for recovering metal from a rinse solution in an electroplating or electroless plating process, said apparatus comprising:

(a) an electroplating or electroless plating system having plating means for plating objects and rinse or drag out means for rinsing the objects following plating in said plating means, said rinse or drag out means yielding a rinse solution having a metal ion content;

(b) ion exchange means for capturing metal ions from the rinse solution;

(c) means for transferring said rinse solution to said ion exchange means;

(d) means for returning the stripped rinse solution to said rinse or drag out means;

(e) means holding an ammonium salt regeneration solution capable of regenerating said ion exchange means by stripping the captured metal therefrom;

(f) means for transferring said ammonium salt regeneration solution from said holding means to said ion exchange means;

(g) means for transferring the regeneration solution exiting said ion exchange means to said plating means; and (h) means for transferring the regeneration solution from said plating means to said holding means following demetallization of said regeneration solution by said plating means.

49. The apparatus according to claim 48, wherein said ion exchange means comprises at least two ion exchange columns, and further comprising flow control means for controlling the flow of rinse solution and regeneration solution through said ion exchange columns for directing rinse solution through one column while the other column is being regenerated and vice versa, thereby accommodating continuous operation.

50. The apparatus according to claim 49, wherein said flow control means comprises a microprocessor.

* * * * *